United States Patent
Shimizu et al.

[11] Patent Number: 6,154,695
[45] Date of Patent: Nov. 28, 2000

[54] AUTOMATIC STEERING DEVICE FOR VEHICLES

[75] Inventors: Yasuo Shimizu; Katsuhiro Sakai, both of Wako, Japan

[73] Assignee: Honda Giken Kogyo Kabushiki Kaisha, Tokyo, Japan

[21] Appl. No.: 09/146,140

[22] Filed: Sep. 3, 1998

[30] Foreign Application Priority Data

Sep. 5, 1997 [JP] Japan .................................. 9-240685

[51] Int. Cl.[7] .................................................. B62D 6/00
[52] U.S. Cl. ............................................. 701/41; 180/204
[58] Field of Search .............................. 701/41; 180/168, 180/169, 204; 342/70, 71; 348/118, 119

[56] References Cited

U.S. PATENT DOCUMENTS

| 4,219,093 | 8/1980 | Lang | 180/401 |
| 4,735,274 | 4/1988 | Good et al. | 180/204 |
| 4,931,930 | 6/1990 | Shyu et al. | 701/36 |
| 5,742,141 | 4/1998 | Czekaj | 318/587 |
| 6,061,002 | 5/2000 | Weber et al. | 340/932.2 |

FOREIGN PATENT DOCUMENTS

| 3-74256 | 3/1991 | Japan . |
| 4-55168 | 2/1992 | Japan . |

*Primary Examiner*—Michael J. Zanelli
*Attorney, Agent, or Firm*—Arent Fox Kintner Plotkin & Kahn, PLLC

[57] ABSTRACT

When a driver voluntarily operates the steering during an automatic steering control operation, the automatic steering control operation is discontinued and a normal power steering control operation is resumed. The automatic steering control operation is not quickly changed to power steering control operation, but rather is gradually changed to the power steering control operation, to prevent a sudden change in the steering reaction which the driver receives from the steering wheel and, hence, to decrease the feeling of incompatibility. While the control amount of a steering actuator changes accompanying the change of the operation from the mode of automatic steering control operation to the mode of power steering control operation, the control amount is linearly changed from a value of the automatic steering control operation to a value of the power steering control operation over a predetermined period of time.

6 Claims, 4 Drawing Sheets

AUTOMATIC STEERING DEVICE FOR VEHICLES

BACKGROUND OF THE INVENTION

1. Field of the Invention

The present invention relates to an automatic steering device for vehicles for automatically parking the vehicle without relying upon a steering operation by the driver.

2. Description of the Prior Art

Automatic steering devices for vehicles are known in Japanese Patent Application Laid-Open Nos. 3-74256 and 4-55168, for example. These automatic steering devices for vehicles utilize an actuator of a well known electric power steering system, and are designed to automatically effect reverse parking or longitudinal parking by controlling the actuator based on a relationship between a traveling distance of the vehicle and a steering angle, which has been stored in advance.

According to the prior art, the driver operates the steering wheel while the automatic steering operation is being controlled and when it is judged that the steering torque has exceeded a predetermined reference steering torque, the automatic steering control operation is discontinued and a normal power steering control operation is assumed. When the automatic steering control operation is quickly changed to the mode of the power steering control operation, however, the steering reaction of the steering wheel suddenly decreases or increases causing the driver to feel an incompatibility.

SUMMARY OF THE INVENTION

The present invention has been accomplished in view of the above-mentioned circumstances, and its object is to save the driver from feeling the incompatibility when the automatic steering control operation is changed to the mode of the power steering control operation.

In order to accomplish the above-mentioned object, the present invention is concerned with an automatic steering device for vehicles comprising, an actuator for steering wheels of the vehicle; a movement locus setting means for storing or calculating a locus of movement of a vehicle up to a target position; and a control means for changing between a first control state for controlling the operation of the actuator based on a steering torque exerted by a driver on a vehicle steering wheel and a second control state for controlling the operation of the actuator based on the locus of movement set by the movement locus setting means. The control means gradually changes the second control state to the first control state. Accordingly, the second control state in which the driving of the actuator is controlled based upon the locus of movement set by the movement locus setting means, is gradually changed to the first control state in which the operation of the actuator is controlled based upon the steering torque exerted to the steering wheel by the driver. Therefore, the steering reaction of the steering wheel is prevented from suddenly changing, and thus, the driver feels more compatibility.

The present invention is also concerned with an automatic steering device for vehicles, wherein the second control state is changed to the first control state by changing a control amount of the actuator in the second control state up to a control amount of the actuator in the first control state over a predetermined period of time. The second control state can thus be gradually changed to the first control state relying on a simple control operation. According to this embodiment, the required time has been set to be one second, which, however, can be changed depending upon the design requirements.

The invention is further concerned with an automatic steering device for vehicles, wherein detection means detects a steering speed or a steering torque, and the rate of changing the second control state to the first control state is increased depending upon the steering speed or the steering torque that is detected. Thus, when the driver quickly manipulates the steering wheel in an attempt to avoid obstacles, the second control state is quickly changed to the first control state, making it possible to reliably avoid the obstacles.

BRIEF DESCRIPTION OF THE DRAWINGS

An embodiment for carrying out the present invention will now be described by way of an example shown in the accompanying drawings.

DETAILED DESCRIPTION OF THE PREFERRED EMBODIMENTS

Figure 1:
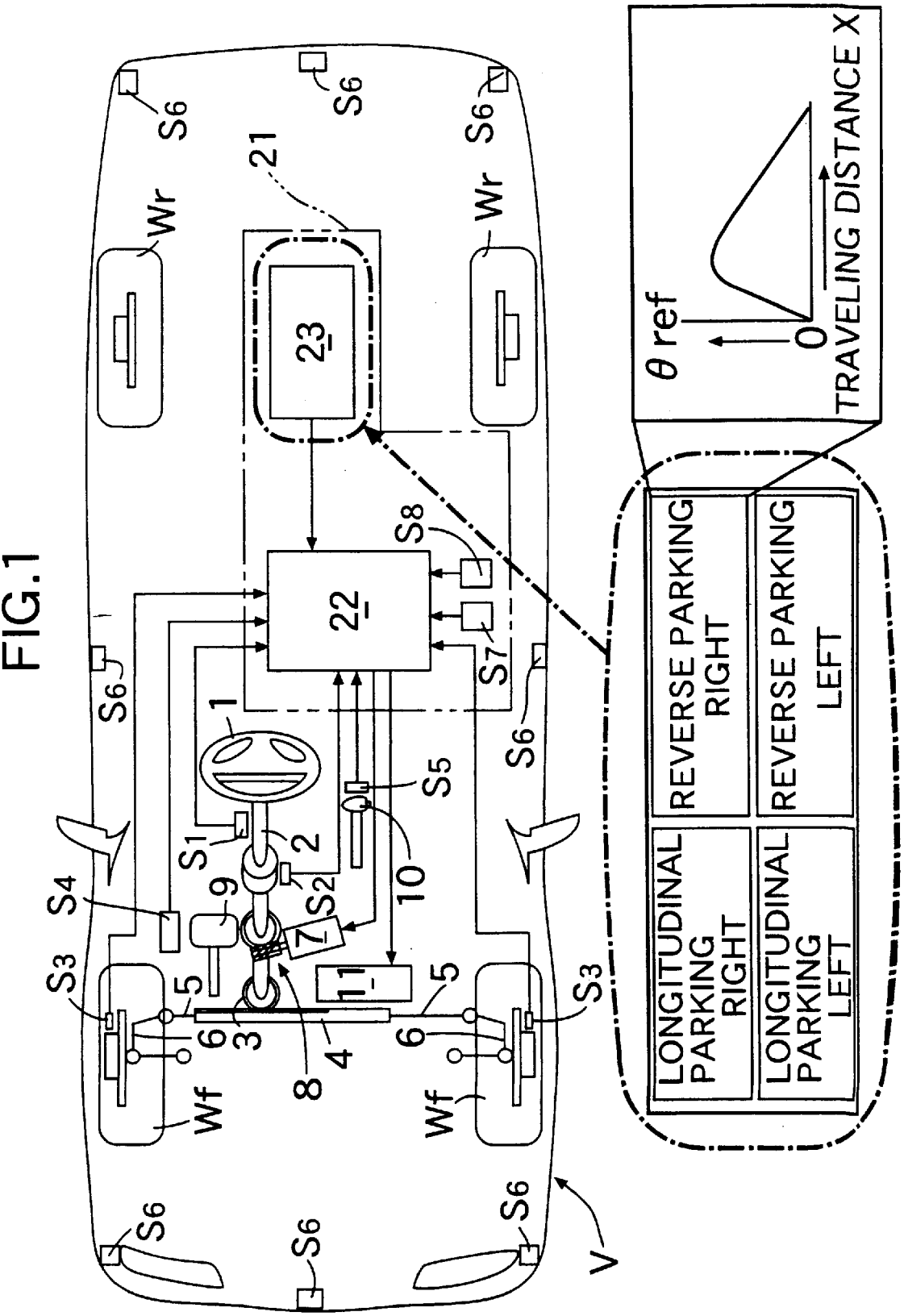
FIG. 1 is a diagram illustrating a vehicle equipped with a steering control device according to the embodiment of the present invention.

As shown in FIG. 1, a vehicle V includes a pair of front wheels Wf, Wf and a pair of rear wheels Wr, Wr. A steering wheel 1 and the front wheels Wf, Wf which are steering wheels, are connected together through a steering shaft 2 that rotates together with the steering wheel 1, a pinion 3 provided at a lower end of the steering shaft 2, a rack 4 meshed with the pinion 3, right and left tie rods 5, 5, provided at both ends of the rack 4, and right and left steering knuckles 6, 6, connected to the tie rods 5, 5. A steering actuator 7 comprising an electric motor, is connected to the steering shaft 2 through a worm gear mechanism 8 in order to assist the driver in operating the steering wheel 1 or to conduct automatic steering for garaging of the vehicle which will be described below.

A steering control unit 21 comprises a controller 22 and a storage means 23. The controller 22 receives a signal from a steering angle detecting means $S_1$ for detecting the steering angle $\theta$ of the front wheels Wf, Wf based on the rotational angle of the steering wheel 1, a signal from a steering torque detecting means $S_2$ for detecting the steering torque of the steering wheel 1, signals from front wheel rotational angle detecting means $S_3$, $S_3$, for detecting rotational angles of the right and left front wheels Wf, Wf, a signal from a brake operation amount detecting means $S_4$ for detecting the operation amount of a brake pedal 9, a signal from a shift range detecting means $S_5$ for detecting the shift range selected by a select lever 10 ("D" range, "R" range, "N" range, "P" range, etc.), and signals from a total of eight object detecting means $S_6$ mounted at a front portion, a central portion and a rear portion of the vehicle V. The object detecting means $S_6$ may be any known type of detector such as sonar, radar, television camera or the like. Lines connecting the eight object detecting means $S_6$ and the controller 22 are omitted to simplify the drawing.

Figure 3:
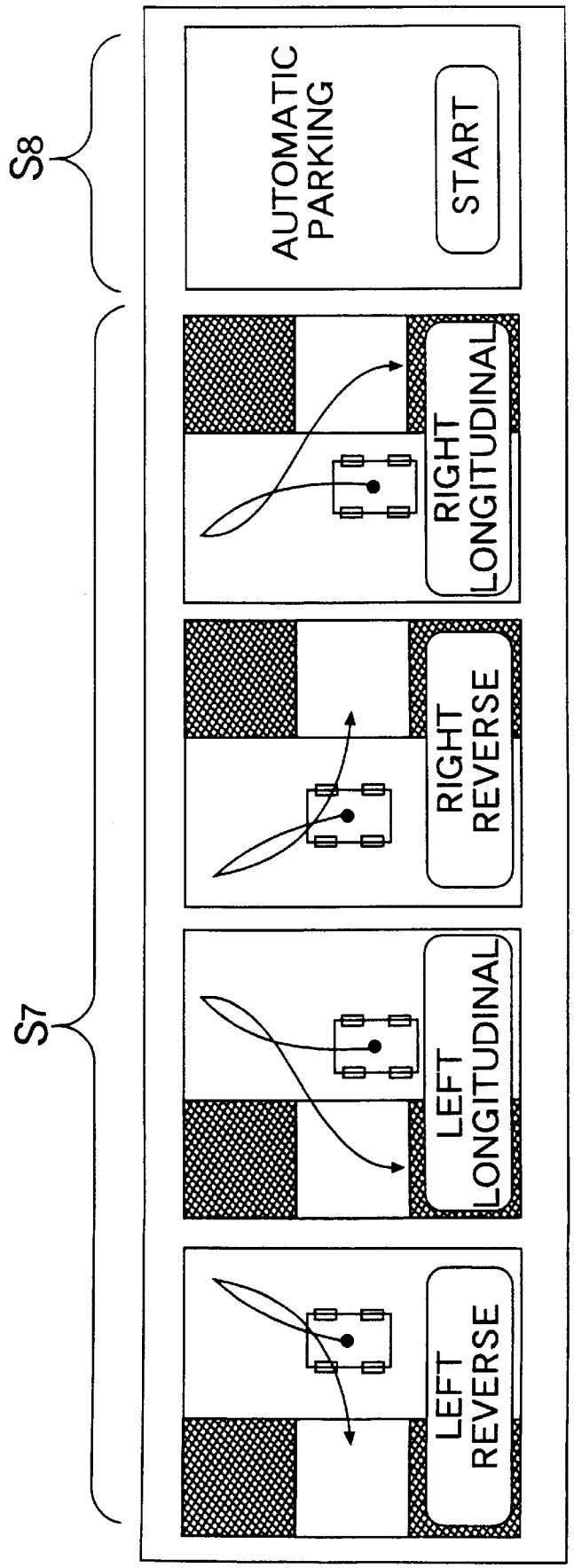
FIG. 3 is a diagram illustrating mode selecting switches and an automatic parking start switch.

A mode selecting switch $S_7$ and an automatic parking start switch $S_8$, which are both operated by the driver, are connected to the controller 22. As will be obvious from FIG. 3, the mode selecting switch $S_7$ is operated at the time of selecting any one of four parking modes, i.e., a reverse parking/right mode, a reverse parking/left mode, a longitudinal parking/right mode and a longitudinal parking/left mode, and includes four switch buttons corresponding to these modes. The automatic parking start switch $S_8$ is operated to start automatic parking in any mode selected by the mode selecting switch $S_7$.

Data for the four parking modes, i.e., relationships of standard steering angles θref relative to traveling distances X of the vehicle V are stored in advance, in the storage means 23, in the form of a table. The traveling distance X of the vehicle V, is calculated by multiplying the peripheral length of the front wheel Wf by the rotational angle of the front wheel Wf detected by the front wheel rotational angle detecting means $S_3$, $S_3$. A high-select value, a low-select value or an average value of the pair of right and left front wheel rotational angle detecting means $S_3$, $S_3$ is used for calculating the traveling distance X.

The controller 22 controls the operation of the steering actuator 7 and the operation of an operation display device 11 which includes a liquid crystal monitor, a speaker, a lamp, a chime, a buzzer or the like, based on the signals from the detecting means $S_1$ to $S_6$ and the switches $S_7$, $S_8$, and the data of the parking modes stored in the storage means 23.

The operation of the embodiment of the present invention having the above-described arrangement will be described below.

When the vehicle is in a normal state in which automatic parking is not carried out (when the automatic parking start switch $S_8$ is not turned on), the steering control unit 21 functions as a general power steering control unit. More specifically, when the steering wheel 1 is operated by the driver to turn the vehicle V, the steering torque detecting means $S_2$ detects the steering torque input to the steering wheel 1, and the controller 22 controls the operation of the steering actuator 7 based on the steering torque. As a result, the right and left front wheels Wf, Wf are steered by the driving force from the steering actuator 7, assisting the driver in executing the steering operation. The state where the power steering control operation is being executed corresponds to the first control state according to the embodiment of the present invention, and the state where the automatic steering control operation is being executed corresponds to the second control state according to the embodiment of the present invention.

Next, automatic parking control will be described with reference to the reverse parking/left mode (mode in which the vehicle V moves back to a parking position on the left side of the vehicle V).

Figure 2A:
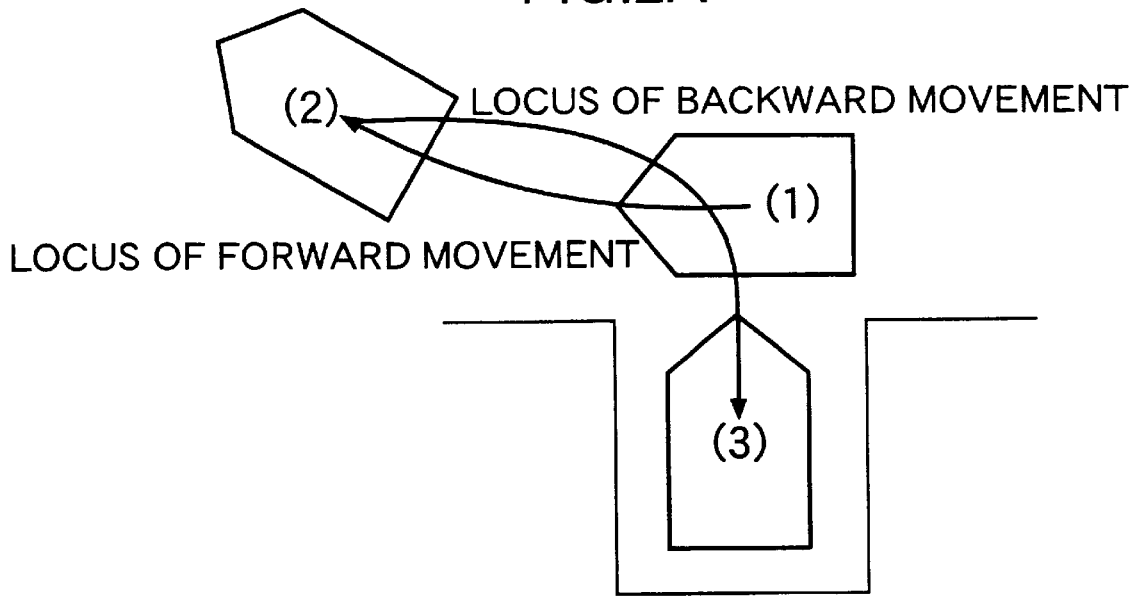
FIGS. 2A and 2B are diagrams illustrating the operation of reverse parking/left mode.

First, as shown in FIG. 2A, the vehicle V is moved near to a garage to be parked. In a state in which the left side of the vehicle body is located as close as possible to the entrance line of the garage, the vehicle V is stopped at a position (start position (1)) at which a predetermined reference point (e.g., a mark formed on the inside of the door or a left side-view mirror) is aligned with a center line of the garage. The mode selecting switch $S_7$ is operated to select the reverse parking/left mode and the automatic parking start switch $S_8$ is turned on to start the automatic parking control operation. While the automatic parking control operation is being carried out, the operation display device 11 displays the present position of the vehicle, obstacles surrounding the vehicle, a parking position, expected locus of movement of the vehicle from the start position to the parking position, a reversing position at which the forward movement is changed into the backward movement, etc. and, at the same time, notifies the driver of various instructions such as operations of the select lever 10 at the reversing position by voice from a speaker as well as an alarm.

Owing to the automatic parking control operation, the driver loosens the brake pedal 9 and lets the vehicle V creep. Therefore, without the need of operating the steering wheel 1, the front wheels Wf, Wf are automatically steered based upon the data of the reverse parking/left mode selected by the mode selecting switch $S_7$. That is, while the vehicle V moves forward from the start position (1) to the reversing position (2), the front wheels Wf, Wf are automatically steered toward the right and while the vehicle V moves backward from the reversing position (2) to a target position (3), the front wheels Wf, Wf are automatically steered toward the left.

Figure 2B:
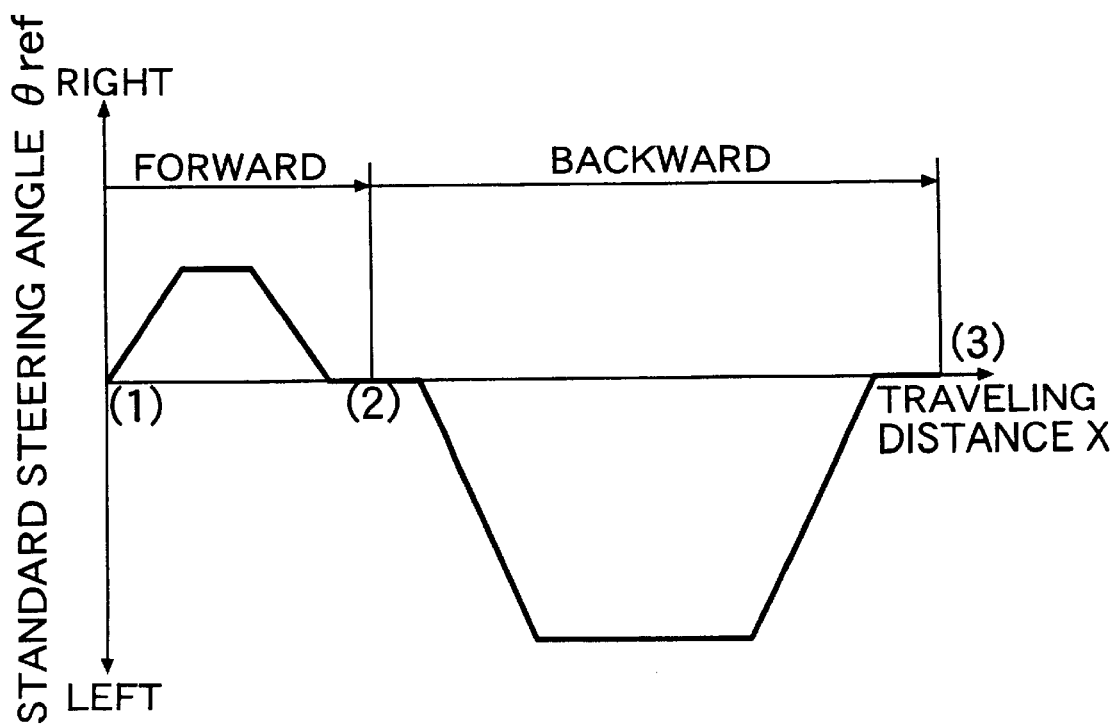

As can be seen from FIG. 2B, while the automatic steering is being carried out, the controller 22 calculates a deviation $E=(θref−θ)$ based on the standard steering angle θref in the reverse parking/left mode, read out from the storage means 23 and the steering angle θ inputted from the steering angle detecting means $S_1$, and controls the operation of the steering actuator 7, so that the deviation E becomes 0. At this time, the data of standard steering angle θref has been set in correspondence to the traveling distance X of the vehicle V. Hence, despite that there is a small variation in the vehicle speed during the creeping of the vehicle, the vehicle V always moves along the above-described locus of movement.

The automatic parking control is executed while the driver is depressing the brake pedal 9 and the vehicle is creeping. Thus, in the event the driver becomes aware of an obstacle, he may quickly depress the brake pedal 9 to stop the vehicle V.

The automatic parking control is canceled when the driver turns the mode selecting switch $S_7$ off, as well as when the driver moves his foot away from the brake pedal 9, when the driver operates the steering wheel 1, or when an obstacle is detected by any one of the object detecting means $S_6$. Then, the normal power steering control is resumed.

Further, described below is the situation when the driver operates the steering wheel 1 to discontinue the automatic parking control. When the driver has discovered an obstacle during the automatic steering control operation or when the driver wishes to change his course, he may operate the steering wheel 1. Then, the steering torque detection means $S_2$ detects the steering torque produced by the steering operation of the driver, whereby the controller 22 interrupts the automatic steering control operation and changes the operation to the normal power steering control operation. This avoids interference between automatic steering and steering by the operation of the driver making it possible to quickly avoid obstacles. Besides, no particular switching operation needs be executed to discontinue the automatic steering control operation, enhancing the convenience.

When the automatic steering control operation is changed to the power steering control operation as a result of the fact that the driver has operated the steering wheel 1 during the automatic steering control operation, the control amount of the steering actuator 7 is changed from a control amount in the automatic steering control operation to a control amount in the power steering control operation. When the control operation is suddenly changed as indicated by the solid line in FIG. 4, the steering reaction abruptly changes while the steering wheel 1 is being operated, and the driver may feel an incompatibility.

Figure 4A:
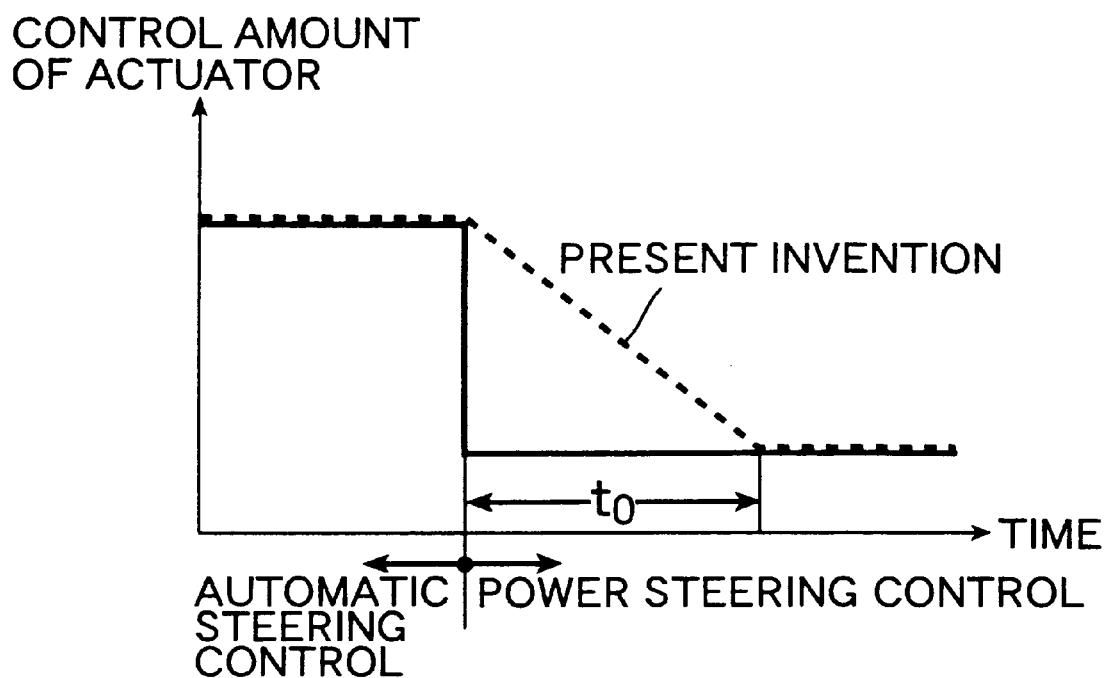
FIGS. 4A and 4B are graphs illustrating an amount of control of the actuator when the operation is changed from the mode of the automatic steering control operation to the mode of the power steering control operation.
Figure 4B:
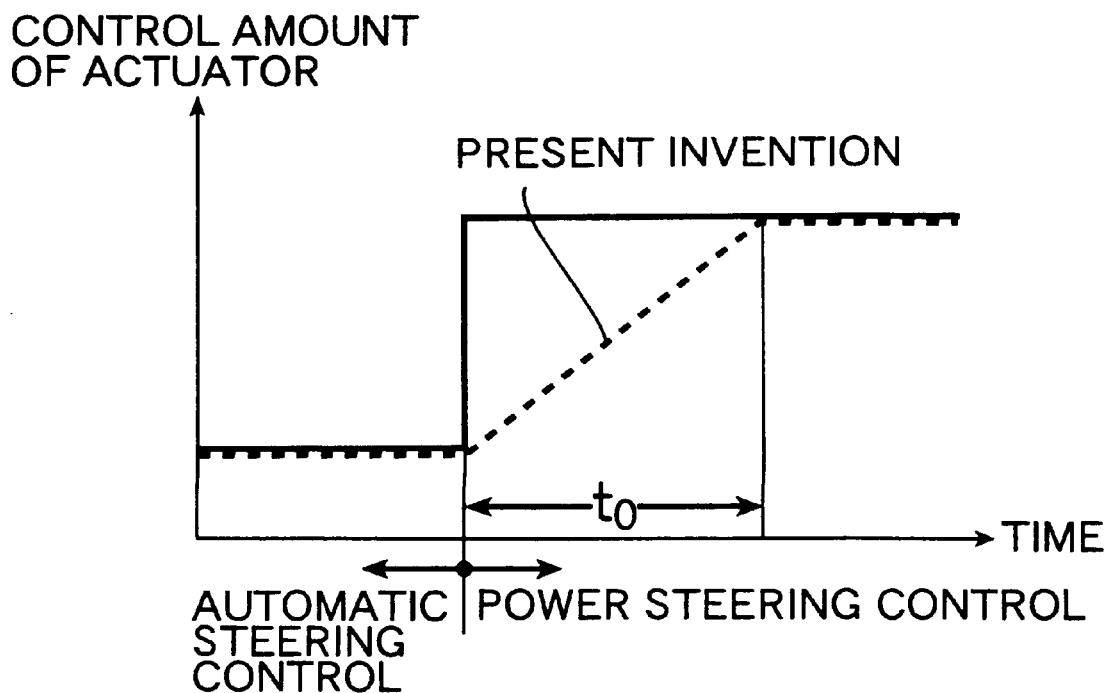

When the control amount of the steering actuator 7 decreases accompanying the change of operation from automatic steering control to power steering control, the control amount is linearly decreased from a value of the automatic steering control down to a value of the power steering control over the passage of a predetermined period of time $t_o$ as shown in FIG. 4A, so that the steering reaction which the driver receives from the steering wheel 1, will not suddenly change. When the control amount of the steering actuator 7 increases accompanying the change of operation from automatic steering control to power steering control, the amount of control is linearly increased from a value of the automatic steering control up to a value of the power steering control over the passage of the predetermined period of time $t_o$ as shown in FIG. 4B, so that the steering reaction which the driver receives from the steering wheel 1 will not suddenly change. This decreases the feeling of incompatibility which the driver may receive, and further prevents the occurrence of the steering angle becoming excessive since the steering wheel 1 suddenly becomes light or the required steering angle not being obtained since the steering wheel 1 suddenly becomes heavy.

When the predetermined period of time $t_o$ is too short, the steering reaction suddenly changes and the effect is not obtained to a sufficient degree. When the predetermined period of time $t_o$ is too long, on the other hand, the proper power steering control operation is not quickly assumed. It is therefore desired that the predetermined period of time $t_0$ is set, for example, to about one second.

The predetermined period of time $t_o$ may not be fixed but may be a function of the steering speed or the steering torque. That is, when the steering speed is high or the steering torque is large, i.e., when a quick steering operation is effected, the predetermined period of time $t_o$ may be shortened so that the automatic steering control operation can be quickly changed to the power steering control operation to enhance the steering response. Therefore, when the driver who has discovered an obstacle during the automatic steering control operation, quickly operates the steering wheel 1, the power steering function can be quickly effected and the obstacle can be reliably avoided.

The steering speed is obtained as a time differentiation value of the steering angle θ detected by the steering angle detecting means $S_1$. Therefore, the steering angle detecting means $S_1$ in this embodiment also functions as a detecting means for detecting the steering speed.

In the above embodiment, the locus of movement of the vehicle V up to the target position has been stored in advance in the storage means 23. It is, however, also possible to calculate the locus of movement from the present position of the vehicle V and the target position.

According to the present invention, the second control state in which the operation of the actuator is controlled based upon the locus of movement set by the movement locus setting means, is gradually changed to the first control state in which the operation of the actuator is controlled based upon the steering torque given to the steering wheel by the driver. Therefore, the steering reaction of the steering wheel is prevented from suddenly changing, and the driver does not feel an incompatibility.

The second control state can be gradually changed to the first control state relying upon a simple control operation.

Further, when the driver has quickly operated the steering wheel to avoid obstacles, the second control state is quickly changed to the first control state, making it possible to reliably avoid the obstacles.

Though the embodiment of the invention was described above in detail, it should be noted that the invention can be modified in a variety of ways without departing from the spirit and scope of the invention.

What is claimed is:

1. An automatic steering device for a vehicle comprising:

an actuator for steering wheels of the vehicle;

a movement locus setting means for storing a locus of movement of the vehicle to a target position; and a control means coupled to the actuator and the movement locus setting means, for changing between a first control state for controlling the operation of the actuator based on a steering torque exerted by a driver on a vehicle steering wheel and a second control state for controlling the operation of the actuator based on the locus of movement set by the movement locus setting means; wherein the control means gradually changes the second control state to the first control state.

2. An automatic steering device for vehicles according to claim 1, wherein the second control state is changed to the first control state by changing a control amount of the actuator in the second control state to a control amount of the actuator in the first control state over a predetermined period of time.

3. An automatic steering device for vehicles according to claim 1, including detection means coupled to the control means, for detecting a steering speed or a steering torque on the steering wheel, wherein the rate of changing the second control state to the first control state is increased depending upon the steering speed or the steering torque that is detected.

4. An automatic steering device for a vehicle comprising:

an actuator for steering wheels of the vehicle;

a movement locus setting means for calculating a locus of movement of the vehicle to a target position; and a control means coupled to the actuator and the movement locus setting means, for changing between a first control state for controlling the operation of the actuator based on a steering torque exerted by a driver on a vehicle steering wheel and a second control state for controlling the operation of the actuator based on the locus of movement set by the movement locus setting means; wherein the control means gradually changes the second control state to the first control state.

5. An automatic steering device for vehicles according to claim 4, wherein the second control state is changed to the first control state by changing a control amount of the actuator in the second control state to a control amount of the actuator in the first control state over a predetermined period of time.

6. An automatic steering device for vehicles according to claim 4, including detection means coupled to the control means for detecting a steering speed or a steering torque on the steering wheel, wherein the rate of changing the second control state to the first control state is increased depending upon the steering speed or the steering torque that is detected.

* * * * *